J. S. KARSKY.
COTTER PIN.
APPLICATION FILED MAY 1, 1922.
1,429,353.
Patented Sept. 19, 1922.
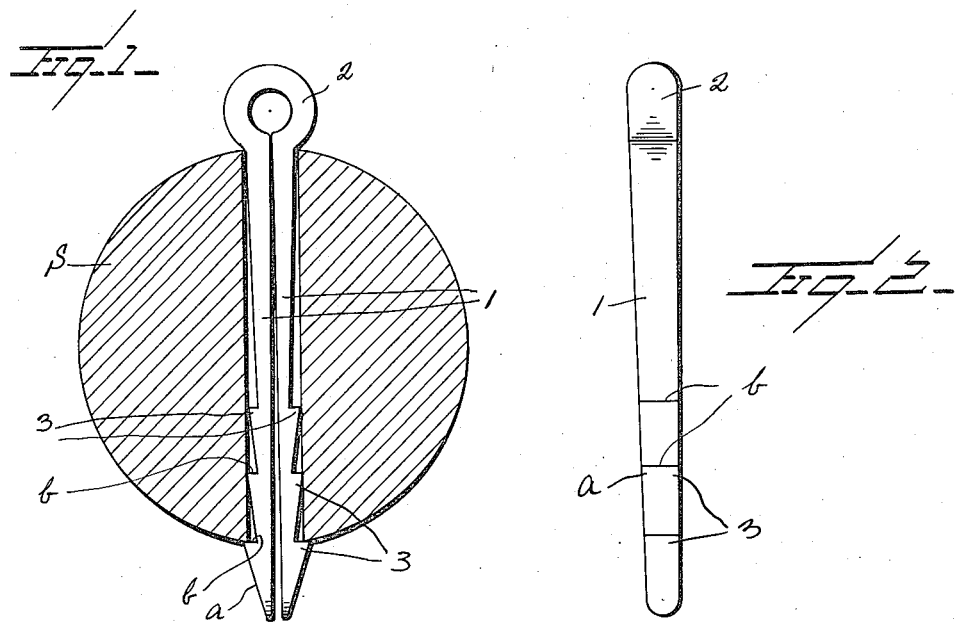
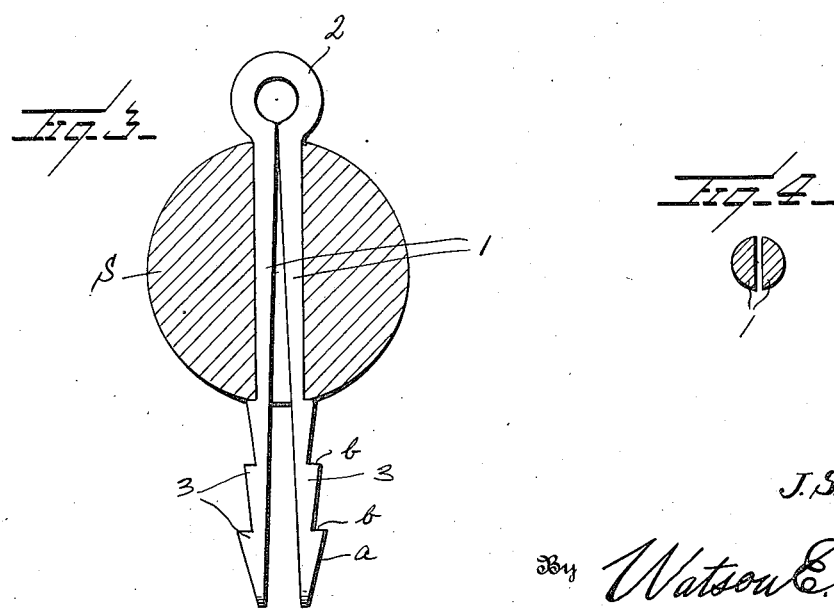
Inventor
J. S. Karsky
By Watson E. Coleman
Attorney Patented Sept. 19, 1922.

1,429,353

UNITED STATES PATENT OFFICE.

JOSEPH S. KARSKY, OF OWEN, WISCONSIN.

COTTER PIN.

Application filed May 1, 1922. Serial No. 557,805.

*To all whom it may concern:*

Be it known that JOSEPH S. KARSKY, a citizen of the United States, residing at Owen, in the county of Clark and State of Wisconsin, has invented certain new and useful Improvements in Cotter Pins, of which the following is a specification, reference being had to the accompanying drawings.

This invention relates to certain improvements in cotter pins and it is an object of the invention to provide a device of this general character having novel and improved means whereby the same is automatically locked in applied position.

Another object of the invention is to provide a novel and improved device of this general character which is of a self locking type and which can be employed with equal facility in connection with shafts or the like of differing diameters.

The invention consists in the details of construction and in the combination and arrangement of the several parts of my improved cotter pin whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein:

Figure 1 is an enlarged view partly in section and partly in elevation illustrating a cotter pin constructed in accordance with an embodiment of my invention and in applied position, Figure 2 is a view in side elevation of the pin as illustrated in Figure 1, Figure 3 is an enlarged view partly in section and partly in elevation showing my improved pin applied to a shaft of a diameter less than the diameter of the shaft shown in Figure 1, and Figure 4 is a cross sectional view taken through the pin as herein disclosed.

As disclosed in the accompanying drawings my improved pin comprises a split shank providing separate legs 1 connected at adjacent ends by the loop 2, such structure being the same as in cotter pins of a conventional type. The legs 1 together with the loop 2 possesses a certain degree of inherent resiliency so that the natural tendency of the leg 1 is to separate. The free end portions of the legs 1 are provided with oppositely directed teeth 3 coplanar with the loop 2. The teeth 3 of each of the legs 1 are herein shown as three in number, said teeth being of a ratchet type with the inclined edge $a$ disposed outwardly and the straight edge or shoulder $b$ in substantially perpendicular relation to the associated leg 1. The edges or shoulders $b$ are successively of greater lengths with the shoulder or edge $b$ of the least length being innermost.

The shorter or innermost edges $b$ are, in the present embodiment of my invention, positioned upon the legs 1 at points to permit said shoulder or edges $a$ to function when the cotter pin is disposed through a shaft S or the like of a diameter of one inch. The intermediate teeth 3 are positioned to function when the pin is disposed through a shaft or the like of a diameter substantially one and one-fourth inches while the outer teeth 3 are positioned to function when the shaft or the like is of a diameter substantially one and one-half inches.

Each of the legs 1 is substantially half round in cross section with the flattened edge opposed to the flattened edge of the second leg and each of said legs is slightly tapered toward the free extremity thereof in order to facilitate the application of the pin in working position.

From the foregoing description it is thought to be obvious that a cotter pin constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a cotter pin comprising a split shank providing separated legs, the free extremities of the legs being provided with outstanding teeth, said teeth successively being of greater lengths.

2. As a new article of manufacture, a cotter pin comprising a split shank providing separated legs, the free extremities of the legs being provided with outstanding teeth, said teeth being of ratchet form with their inclined edges disposed toward the extremities of the legs, the inner ends of the teeth being successively of greater lengths.

In testimony whereof I hereunto affix my signature.

JOSEPH S. KARSKY.